US005171179A

United States Patent [19]

Van Der Aa

[11] Patent Number: 5,171,179

[45] Date of Patent: Dec. 15, 1992

[54] METHOD OF MANUFACTURING A COLOR DISPLAY TUBE

[75] Inventor: Herman H. M. Van Der Aa, Eindhoven, Netherlands

[73] Assignee: U.S. Philips Corporation, New York, N.Y.

[21] Appl. No.: 322,745

[22] Filed: Mar. 13, 1989

[30] Foreign Application Priority Data

Mar. 17, 1988 [NL] Netherlands ........................ 880657

[51] Int. Cl.[5] ........................ B23K 26/02

[52] U.S. Cl. ........................ 445/30

[58] Field of Search ........................ 445/30

[56] References Cited

U.S. PATENT DOCUMENTS

| | | | |
|---|---|---|---|
| 3,983,612 | 10/1976 | Palmer | 445/30 |
| 4,271,345 | 6/1981 | Palmer | 445/30 |
| 4,730,143 | 3/1988 | Fendley | 313/407 |
| 4,828,523 | 5/1989 | Fendley | 445/30 |

FOREIGN PATENT DOCUMENTS

| | | | |
|---|---|---|---|
| 0159167 | 12/1979 | Japan | 445/30 |
| 0009935 | 1/1981 | Japan | 445/30 |

*Primary Examiner*—Kurt C. Rowan
*Attorney, Agent, or Firm*—John C. Fox

[57] ABSTRACT

A method of manufacturing a color display tube comprising an envelope having a display window and a color selection electrode and suspension means for suspending the color selection electrode, which four suspension means each contain a member which is fused into the envelope. In the method these members are heated by means of a laser. The members may be provided with bores on which the laser beam is incident, the surfaces of which may be blackened to increase heat absorption. The method is more energy efficient and less cumbersome than the prior method which relied upon coils to heat the members by induction of eddy currents.

18 Claims, 3 Drawing Sheets

METHOD OF MANUFACTURING A COLOR DISPLAY TUBE

BACKGROUND OF THE INVENTION

The invention relates to a method of manufacturing a colour display tube comprising an envelope having a display window and, in the envelope, a colour selection electrode have a large number of apertures, and suspension means for suspending the colour selection electrode opposite the display window, a member of each suspension means being fused, at least in part, into the envelope.

Such a method is known from U.S. Pat. No. 4,271,345.

In said patent a method is described in which a pin-shaped member of each suspension means is fused into the display window by means of a heating element which contains a primary and a secondary high-frequency induction coil. The secondary induction coil contains a projecting loop into which the member is partly introduced. The part of the member to be fused into the envelope projects from the loop. By generating a high-frequency electric field in the primary induction coil a high-frequency field is generated in the secondary coil and, hence, also in the loop of the secondary coil. The high-frequency field in the loop heats the part of the member introduced into the loop by means of high-frequency eddy currents generated in the member. Subsequently, the member is fused into the envelope by moving the heating element such that the part of the member projecting from the loop of the secondary coil penetrates into the envelope. A disadvantage of this method is that its efficiency is very low. Only a very small part of the energy is used effectively.

OBJECT AND SUMMARY OF THE INVENTION

For this reason it is an object of the invention to provide a method having a higher efficiency.

To this end the method according to the invention is characterized in that during fusing, the said members to be fused into the envelope are heated by means of a laser beam.

Such provides an accurately localized supply of the energy needed to fuse a member into the envelope. The amount of heat supplied can be accurately adjusted so that no more energy than necessary is used. Moreover, this reduces the spread in properties of the connections formed between the fused members and the envelope amongst individual tubes.

A further advantage of the method according to the invention is that no direct contact is required between a heating element and the member of a suspension means to be fused. This is advantageous, in particular, when use is made of relatively small members or when members are fused in places which are relatively difficult to access. A further advantage relative to the known state of the art is that laser light, can be generated for several fusing locations by means of one central laser arrangement and can be led to the fusing arrangements by means of reflectors or optical fibres, whereas power-supply apparatus for heating elements making use of a high-frequency electric field take in relatively more space and have to be positioned close to the fusion location. Furthermore, in the known state of the art, the shape of the member to be fused and the shape of the projecting loop must be adapted to one another since a part of the member to be fused is inserted into the projecting loop. The method according to the invention imposes no restrictions on the shape of the member to be fused.

The prior art method cannot be used to fuse members which consist entirely or partly, i.e. the part introduced into the loop, of an electrically non-conductive material, since in such materials no or only very small eddy currents are generated. In the method according to the invention, members which consist entirely or partly of electrically non conductive materials can be fused into the envelope.

A preferred embodiment of the method according to the invention is characterized in that a member to be fused is provided with bores which are closed on one side, the laser beam being incident on the open side whereby energy is supplied to the inside of the member. In this way the loss of energy is reduced so that the member is heated more quickly and in a more controlled manner.

A further embodiment of the method according to the invention is characterized in that a member to be fused has a base and the bore extends into the base.

The energy is thus supplied directly to the base. Since this is the part of the member which is fused, this results in an increased fusing rate.

A still further embodiment of the method according to the invention is characterized in that the bore extends conically (tapers inwardly) from the open side to the interior. In this way the energy of the laser beam is concentrated in the tip of the bore, thus increasing the efficiency with which the member is heated.

A still further embodiment of the method according to the invention is characterized in that the bore is blackened on the inside.

In this way, the absorption of the laser beam in the bore is increased.

Another embodiment of the method according to the invention is characterized in that a member is fused, such that the member-glass contact area extends substantially in one plane i.e., is fused to the surface or to a very small depth of the envelope. To this end, the member preferably has a flat rather than a pointed base, wherein the temperature distribution is more homogeneous, resulting in faster fusion.

A further embodiment of the method according to the invention is characterized in that the laser beam passes through the envelope this may be advantageous if the member is to be fused in a place which is not readily accessible.

A still further embodiment is characterized in that two or more members are fused at least substantially simultaneously. This accelerates the fusion process.

BRIEF DESCRIPTION OF THE DRAWING

The invention will now be described in more detail by means of a few embodiments and with reference to the drawing, in which:

The Figures are schematic representations and are not drawn to scale, corresponding parts in the different embodiments bearing the same reference numerals.

FIG. 1 is a sectional view of a colour display tube manufactured according to the invention. The colour display tube comprises an envelope 1 having, in the present example, a substantially rectangular display window 2 having an upright edge 3. The envelope further comprises a cone 4 and a neck 5. A pattern of phosphors 6 luminescing in red, green and blue is provided on the display window 2.

Figure 1:
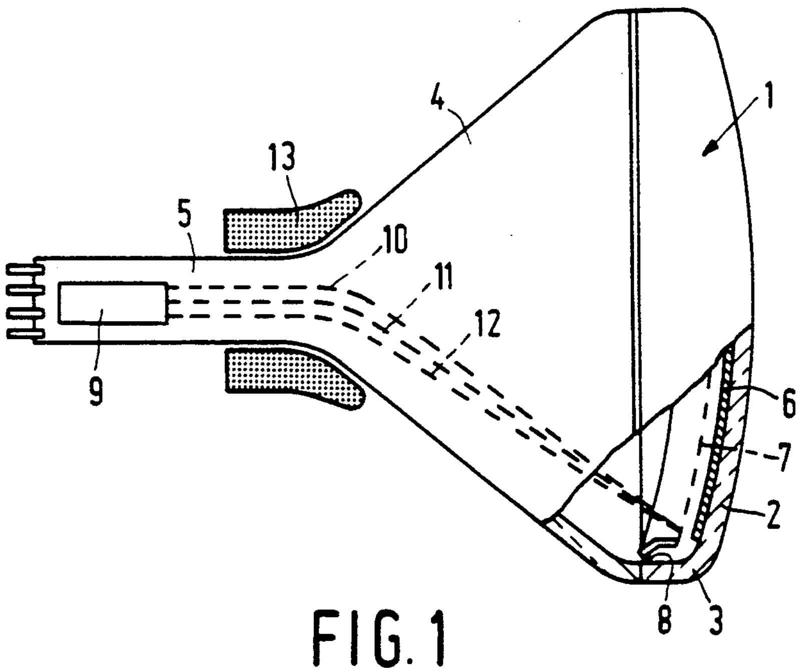
FIG. 1 is a schematic, sectional view of a colour display tube manufactured according to the invention.

An electron gun 9 for generating three electron beams 10, 11 and 12 is mounted in the neck 5 of the colour display tube. These beams are deflected by a coil system 13 and intersect substantially at the location of the colour selection electrode 7, after which each of the electron beams is incident on one of the three phosphors provided on the screen.

Each suspension means 8 comprises a member, which is fused into the envelope at its base, in this example, near the corner of the upright edge 3 of the display window 2, and a second member connected to the colour selection electrode, which in the present example is a plate-shaped resilient element which extends transversely to the electron beams 10, 11 and 12 when they are deflected to the relevant corner.

Figure 2:
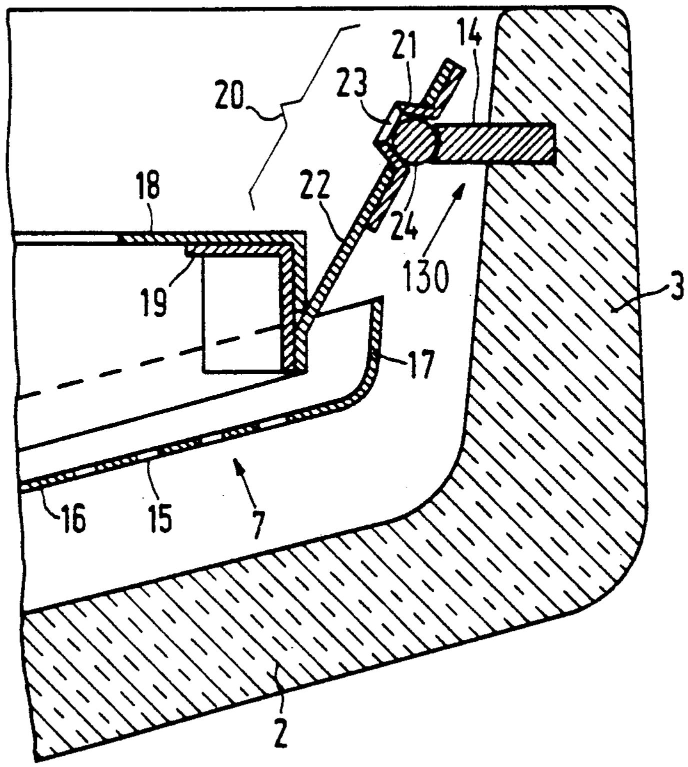
FIG. 2 is a detailed sectional view of a colour display tube manufactured according to the invention which detail represents, inter alia, the suspension means.

FIG. 2 is a detailed sectional view of a corner region of the colour display tube manufactured according to the invention as shown in FIG. 1. The member 130 of a suspension means 8 is fused into the upright edge 3 of the display window 2 by means of a pin 14 which, in the present example, extends transversely to the edge 3 of the display window 2. The colour selection electrode 7 is formed from a thin mask sheet 16 having a large number of apertures and provided with an upright edge 17. A mask frome 18 is secured to the upright edge 17. A support strip 19 is secured to the corner of the mask frome 18. The second member of the suspension means, a flat resilient element 20, is secured to said support strip 19. The flat resilient element 20 is at an angle to the longitudinal axis of the colour display tube, such that it extends substantially perpendicularly to the electron beams 10, 11 and 12 when they are deflected to the relevant corner of the display window 2. In the present example, the flat resilient element 20 contains a part 21 which has partly the shape of a hollow cone, and which is secured to a substantially flat part 22. Part 21 comprises aperture 23 which engages head 24 of the member 13. The shape of the members shown herein is not to be regarded as limitative.

Figure 3A:
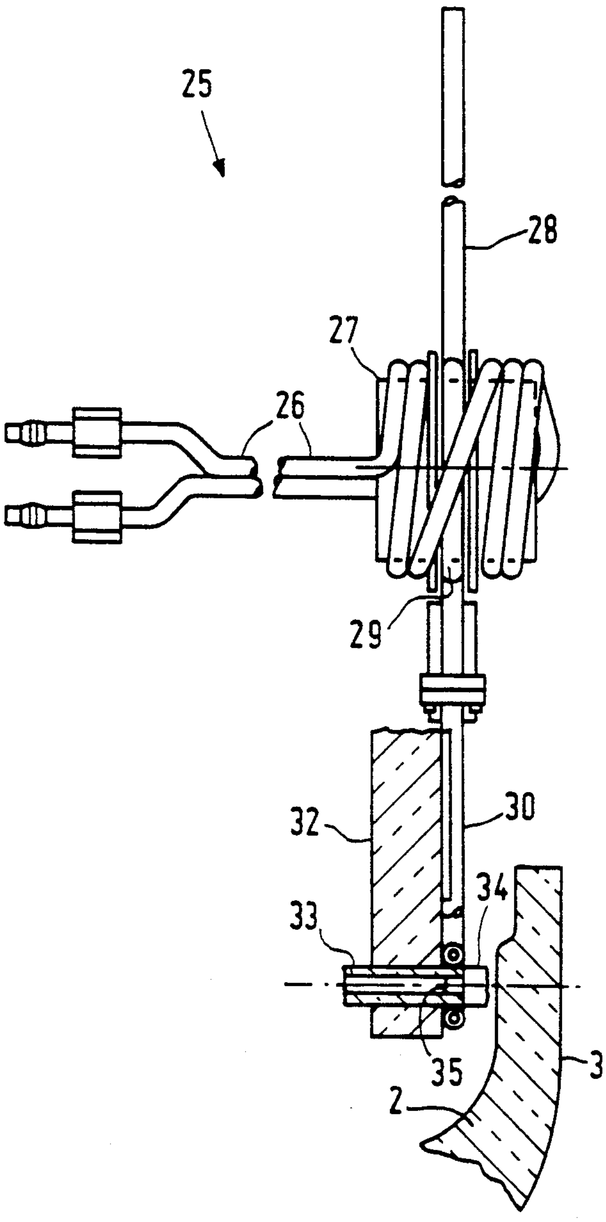
FIG. 3a PRIOR ART
FIGS. 3*a* and 3*b* are illustrations of the method according to the prior art.
Figure 3B:
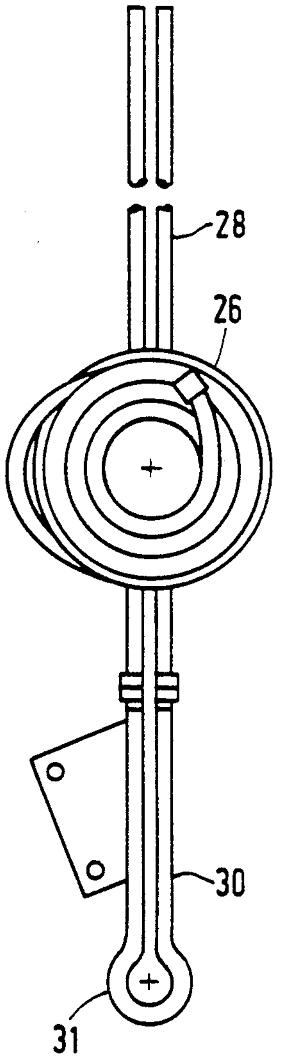
FIG. 3b PRIOR ART

FIGS. 3*a* and 3*b* are illustrations of the method according to the prior art. The heating element 25 comprises a primary coil 26 which is wound around a sleeve 27 which is made of a non-conductive material. The heating element also comprises a secondary coil 28 having a central turn 29 and an outer turn 30 having an eye 31. The primary turn can be connected to a high-frequency alternating-voltage source, which is not shown. The outer turn 30 is connected to a support 32 in which a tube 33 is placed which leads to eye 31. The part of a retaining means to be fused, being the part 35 of the pin 34 in the present example, is placed in tube 33 which is subsequently evacuated so that pin 34 is held in tube 33. During operation, the alternating voltage source is switched on, thus generating an alternating voltage in the secondary coil and, hence, a high-frequency electromagnetic field in eye 31 of outer turn 30. This high-frequency field generates eddy currents in pin 34, predominantly in part 35, thereby increasing its temperature. Subsequently, when pin 34 has been heated sufficiently, the base of said pin 34 is fused into the upright edge 3 of the display window 2. The disadvantages of this method are that only a very small part of the energy is used to heat the member to be fused; and large and spatious supply apparatus are necessary to supply the energy necessary. Consequently, measures have to be taken to discharge the heat which is produced not in the first element but elsewhere (e.g., in the supply apparatus and/or the primary turn). In addition, the shape of the member to be fused must be adapted to that of the eye; said member must also be made of a conductive material, that is, at least the part which is introduced into the eye; problems may arise if this part is to be fused in a place not readily accessible or obliquely on the envelope. In other words, complicated equipment is necessary and restrictions are imposed on the shape and material of the member to be fused in order to supply the heat necessary to the part of the member to be fused into the envelope.

Figure 4A:
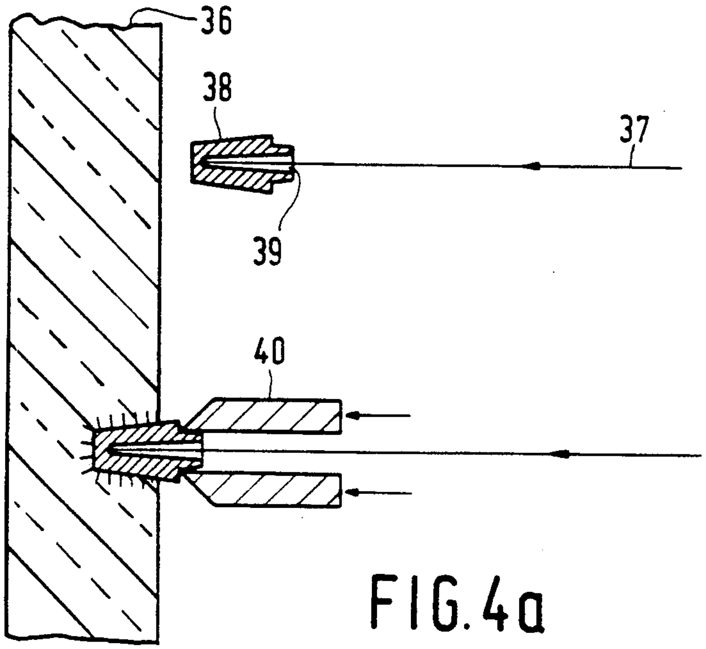
FIGS. 4*a*, 4*b* and 4*c* are illustrations of the method according to the invention.

FIG. 4*a* is an illustration of the method according to the invention. Member 38 (corresponding to pin 14 in FIG. 2) is heated by means of a laser beam 37. Member 38 is provided with a bore 39. Member 38, hereinafter called "pin", is subsequently pressed into the envelope 36 by means of a pressure system 40. This can be carried out in any place and at any angle desired because it does not require complicated equipment. In the present example, the pin 38 is provided with a conical bore 39 which extends into the part to be fused. Owing to this, energy is supplied to where it is necessary. The least possible energy is lost. In the present example, laser beam 37 and pin 38 are on the same side of the envelope. In order to increase the absorption of heat from the laser beam, the bores may be blackened, that is, provided with a substance or treated such that a very high absorption of heat from the laser beam is obtained at the inner surface of the bores.

Figure 4B:
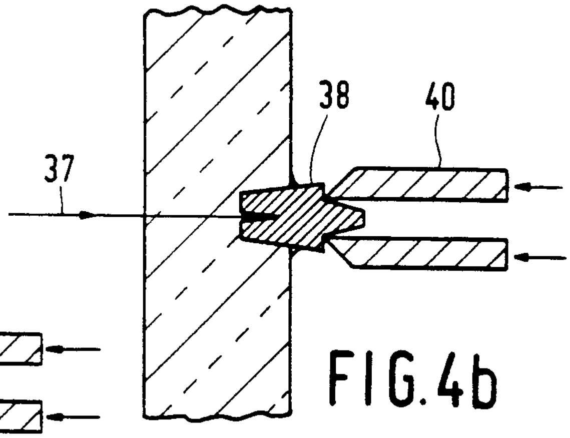

It is alterantively possible to heat pin 38 by means of a laser beam which passes through the envelope, as is shown in FIG. 4*b*. This may have advantages, for example, if it is difficult or impossible to subject the pins directly to the laser beam because of the presence of objects around the pins.

Figure 4C:
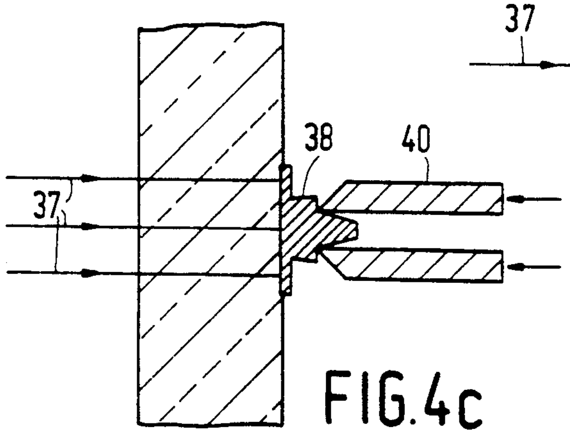

FIG. 4*c* shows a pin 38 having a flat base, i.e., the portion of the pin 38 to be fused. The advantage of this embodiment is that the laser beam does not have to be focussed, less glass has to be displaced, and the temperature of the base is more homogeneous during the fusion process. An inhomogeneous temperature distribution in the base, induces, after cooling, thermal stresses in the glass. Besides, when the temperature distribution is inhomogeneous there is a greater risk that the glass is locally overheated.

Figure 5:
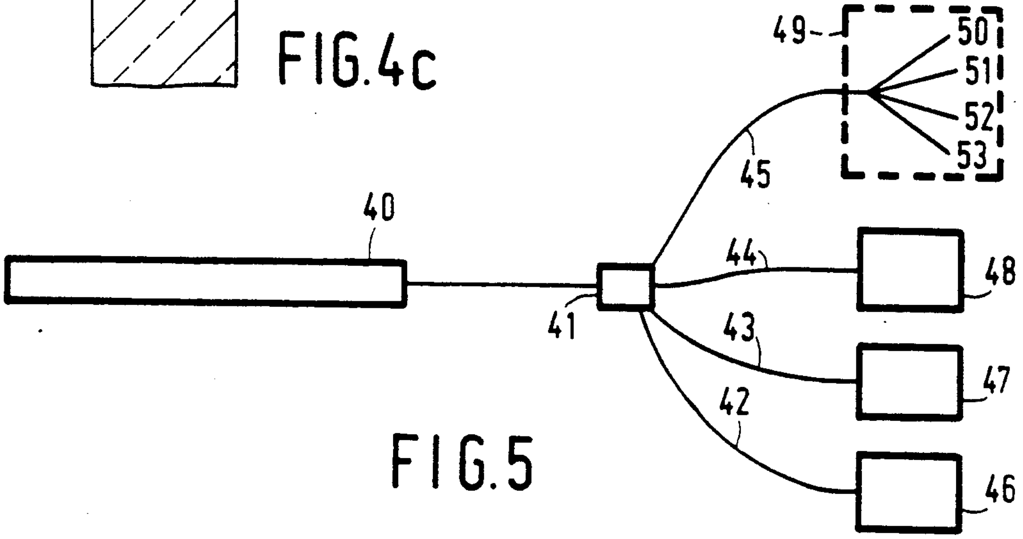
FIG. 5 shows a laser light distribution arrangement which can suitably be used in the method according to the invention.

FIG. 5 shows an arrangement for distribution of laser light which can be used in the method according to the invention. One laser can be used for each fusing location. However, it is also possible to use one common laser for a group of fusing locations. In this way, the total space needed for the group of fusing means is reduced. Such an arrangement is schematically shown in FIG. 5. A laser beam is generated by laser 40. This laser beam is divided into n-sub-beams, in the present example four, 42 through 45, in the optical divider 41.

These sub-beams are led to locations 46 through 49. These sub-beams may be sub-divided further, as shown, for example, in FIG. 5, in which sub-beam 45 is sub-divided into four beams 50 to 53 at the fusing location 49. The latter division has the advantage that four members can be fused simultaneously, which is much quicker and reduces the possibility of errors in the positioning relative to one another.

It will be clear to those skilled in to art that within the scope of the present invention many variations are possible.

I claim:

1. Method of manufacturing a color display tube comprising a glass envelope having a display window and, in the envelope, a color selection electrode having a large number of apertures, and suspension means for suspending the color selection electrode opposite the display window, each suspension means including a member to be fused, at least partly, to the envelope along a member-glass contact area, comprising heating said member to be fused by a laser beam, characterized in that the member to be fused is provided with a bore which is closed on one side, and open on the other side, and the laser beam is incident on the open side.

2. A method as claimed in claim 1, characterized in that a member has a base and that the bore extends into the base.

3. A method as claimed in claim 2, characterized in that the bore extends conically from the open side to the interior of the member.

4. A method as claimed in claim 3, characterized in that a the bore is blackened on the inside.

5. A method as claimed in claim 1, characterized in that the member-glass contact area extends substantially in one plane.

6. A method as claimed in claim 5, characterized in that the laser beam passes through the envelope.

7. A method as claimed in claim 6, characterized in that at least two members are fused at least substantially simultaneously.

8. A colour display tube manufactured according to the method as claimed in claim 5.

9. A method as claimed in claim 1, characterized in that the laser beam passes through the envelope, and in that at least two members are fused at least substantially simultaneously.

10. A method as claimed in claim 1, characterized in that the laser beam passes through the envelope.

11. A method as claimed in claim 2, characterized in that the bore is blackened on the inside.

12. A color display tube manufactured according to the method as claimed in claim 11.

13. A method as claimed in claim 1, characterized in that the bore is blackened on the inside.

14. A color display tube manufactured according to the method as claimed in claim 13.

15. A method as claimed in claim 1, characterized in that the bore extends conically from the open side to the interior.

16. A color display tube manufactured according to the method as claimed in claim 15.

17. A method as claimed in claim 15, characterized in that the bore is blackened on the inside.

18. A color display tube manufactured according to the method as claimed in claim 17.

* * * * *